United States Patent [19]
Massey et al.

[11] Patent Number: 5,923,873
[45] Date of Patent: Jul. 13, 1999

[54] METHOD FOR DETERMINING SERVER STAFFING IN MANAGEMENT OF FINITE SERVER QUEUEING SYSTEMS

[75] Inventors: William A. Massey, Somerset; Ward Whitt, Basking Ridge, both of N.J.

[73] Assignee: Lucent Technologies Inc., Murray Hill, N.J.

[21] Appl. No.: 08/580,264

[22] Filed: Dec. 28, 1995

[51] Int. Cl.$^6$ ...................................................... G06F 9/00
[52] U.S. Cl. .......................................... 395/670; 395/674
[58] Field of Search ................................... 395/670, 672, 395/674

[56] References Cited

PUBLICATIONS

G. M. Thompson, "Accounting for the multi–period impact of service when determining employee requirements for labor scheduling," *J. Opns. Mgmt.*, vol. 11, 1993, pp. 269–287.

P. W. Glynn et al, "A New View Of The Heavy–Traffic Limit Theorem For Infinite–Server Queues," *Adv. Appl. Prob.*, vol. 23, 1991, pp. 188–209.

W. A. Massey et al., "Unstable Asymptotics For Nonstationary Queues," *Mathematics of Operations Research*, vol. 19, No. 2, 1994, pp. 267–291.

S. G. Eick et al., $M_t/G/\infty$ Queues with Sinusoidal Arrival Rates, *Management Science* vol. 39, No. 2, Feb. 1993, pp. 241–252.

W. A. Massey et al., "An Analysis Of The Modified Offered––Load Approximation For the Nonstationary Erlang Loss Model," *The Annals of Applied Probability*, vol. 4, No. 4, Nov. 1994, pp. 1145–1160.

A. E. Eckberg, Jr., "Generalized Peakedness Of Teletraffic Processes," ITC–10, Session 4.4b, Paper #3, pp. 1–7.

J. L. Davis et al., "Sensitivity to the Service–time Distribution in the Nonstationary Erlang Loss Model," *Management Science*, vol. 41, No. 6, Jun. 1995, pp. 1107–1116.

W. Whitt, "Understanding The Efficiency Of Multi–Server Service Systems," *Management Science*, vol. 38, No. 5, May 1992, pp. 708–723.

W. A. Massey et al., "Networks of infinite–server queues with nonstationary poisson input," *Queueing Systems*, 13, 1993, pp. 183–250.

K. W. Fendick et al., "Measurements and Approximations to Describe the Offered Traffic and Predict the Average Workload in a Single–Server Queue," *Proceedings of the IEEE*, vol. 77, No. 1, Jan. 1989, pp. 171–194.

S. G. Eick et al., "The Physics Of The $M_t/G/\infty$ Queue," *Operations Rsearch*, vol. 41, No. 4, Jul.–Aug. 1993, pp. 731–742.

S. Halfin et al., "Heavy–Traffic Limits for Queues With Many Exponential Servers," *Operations Research*, vol. 29, No. 3, May–Jun. 1981, pp. 567–587.

W. Whitt, "Heavy–Traffic Approximations For Service Systems With Blocking," *AT&T Bell Laboratories Technical Journal*, vol. 63, No. 5, May–Jun. 1984, pp. 689–708.

W. A. Massey et al., "Networks of infinite–server queues with nonstationary Poison input," *Queueing Systems*, vol. 13, 1993, pp. 183–250.

*Primary Examiner*—Majid A. Banankhah

[57] ABSTRACT

A method determines the number of servers as a function of time required for a finite server queueing system based on a projected load. The number of servers is chosen subject to the constraint that the probability of delay before beginning service does not exceed a target probability at all times. The finite server queueing system is first advantageously modeled as an infinite-server system and the mean and variance of the number of busy servers at time t is determined and a distribution is approximated. For any time, the number of servers is chosen to be the least number so that the probability that these are all busy is less than the target probability. As an optional refinement, the infinite server target tail probability is then related to the actual delay probability in the finite server system.

9 Claims, 2 Drawing Sheets

METHOD FOR DETERMINING SERVER STAFFING IN MANAGEMENT OF FINITE SERVER QUEUEING SYSTEMS

TECHNICAL FIELD

The invention relates to the field of queueing or service systems.

BACKGROUND

Queueing systems are systems in which customers arrive, wait their turn to be served, are served by a server, and then depart. Supermarket checkout lines, telephone operator service centers, bank teller windows and doctor's waiting rooms are examples of queueing systems. Queueing systems are advantageously characterized by five components:

1. the customer arrival process (formally described as a stochastic process, e.g. a random counting process that describes the probability that the number of customers arriving in any time interval is a value k),
2. the service time process (more formally described by a probability cumulative distribution function for each time t which indicates the probability that the time required to serve a customer arriving at time t is less than or equal to a value y),
3. the number of servers in the queueing system,
4. the queueing discipline, which describes the order in which customers are taken from the queue (e.g. first come, first served or sickest patient first), and
5. the amount of buffer space in the queue, which describes how long the queue may be before customers are "lost" or turned away from the system.

See, Andrew S. Tanenbaum, *Computer Networks*, 2 ed., Prentice Hall, Englewood Cliffs, N.J., 1989; R. W. Hall, *Queueing Methods for Services and Manufacturing*, Prentice Hall, Englewood Cliffs, N.J., 1991.

One important consideration in queueing systems is the determination of how many servers are needed as a function of time. In particular, it is often the case that servers are assigned as function of time in response to anticipated changing loads on the system (i.e., to projected changes in the customer arrival process or to projected changes in the service time required by customers). For example, the problem may be to assign a time-varying number of operators at a telephone office at the beginning of each day where the number of servers is allowed to change every hour or every quarter hour. This general problem is often referred to as the server staffing problem.

It is advantageous to analyze the server staffing problem in queueing systems by partially characterizing components of a queueing system by one or more functions. In particular, the arrival process advantageously is at least partially characterized by an arrival rate, $\lambda(t)$ (i.e., $\lambda(t)\Delta t$ describes the expected number of arrivals in the time interval $(t, t+\Delta t)$ for small $\Delta t$). If the arrival process is a Poisson process (useful in describing many chance phenomena), the arrival process is completely characterized by $\lambda(t)$. See, e.g., A. Papoulis, *Probability, Random Variables, and Stochastic Processes*, 2 ed., McGraw-Hill, New York, 1984. Otherwise, $\lambda(t)$ only partially characterizes the arrival process, and other functions, such as those describing variability about the rate $\lambda(t)$ need to be specified.

The problem of server staffing based on projected loads is a difficult problem if the arrival rates and/or service time processes of the queueing system are not constant (e.g. when $\lambda(t)$ is not a constant for all t). If the arrival rates and/or service time processes of the queueing system vary with time, then the queueing system is said to be nonstationary. Although the server staffing problem with a stationary arrival rate and stationary service time process has been analyzed extensively, if the queueing system is nonstationary, then it is difficult to determine the number of servers as a function of time, s(t), and approximations are typically used. See, e.g., Hall, supra.

One way to address the nonstationary server staffing problem is to use a steady state analysis. In such an analysis either 1) the arrival rate is assumed to change sufficiently slowly relative to the service times so that steady state formulas can be applied at specific points in time using the arrival rates prevailing at those times or 2) the arrival rate is assumed to be some long term average arrival rate and steady-state formulas are applied using this long term average arrival rate. See, e.g., Hall, supra.

Another way to address the nonstationary server staffing problem is to recognize that the probability distribution of the number of customers present at any given time is advantageously approximated as a normal distribution, which normal distribution is specified by mean and variance parameters. The mean and variance of the approximated normal distribution have been determined by various ad hoc methods, e.g., by refining to the steady state analysis. See, e.g., G. M. Thompson, "Accounting for the Multi-Period Impact of Service When Determining Employee Requirements for Labor Scheduling," *J. Opns. Mgmt.*, vol. 11, pp. 269–288 (1993). Given the probability distribution of the number of customers in the queueing system at time t, it is possible to select the smallest possible value j for the number of servers such that the probability that all j servers are busy at time t is less than or equal to some target value $\gamma$. The value $\gamma$ determines the probability that a customer arriving at time t will encounter a delay before beginning to receive service. If $p_n$ is the probability that the number of customers present is a value n at time t, then j is selected such that $$\sum_{n=j}^{\infty} p_n \le \gamma \text{ while } \sum_{n=j-1}^{\infty} p_n > \gamma.$$

However, the techniques described above for allocating servers in nonstationary queueing systems typically are not sufficiently accurate to determine server staffing as a function of time. In particular the techniques typically over-allocate servers at some times (thereby increasing system costs since not all servers will be fully utilized) and/or under-allocate servers at other times (thereby causing congestion, i.e. long waiting times for customers in the queue). Hence there is a need for better techniques for allocating servers in nonstationary queueing systems.

SUMMARY

In accordance with the present invention it is recognized that the number of servers as a function of time in a nonstationary finite queueing system may be allocated based on a probability distribution of the number of busy servers in a non-stationary queueing system with an infinite number of servers. In particular, the probability distribution is characterized by a mean function and a variance function, wherein the mean and variance functions are expressed in terms of input parameters that characterize the finite server queueing system.

DETAILED DESCRIPTION

The detailed description is divided into three parts. In Part I an overview of the inventive method is presented. In particular, a system in which the inventive method may be used is described and the steps in the inventive method are explained. Part I also defines terms useful in characterizing the operation of queueing systems. Part II, describes techniques for implementing the inventive method and discusses the inventive method for queueing systems having specific characteristics. Part III discusses other applications of the inventive method.

I. Overview

Figure 1:
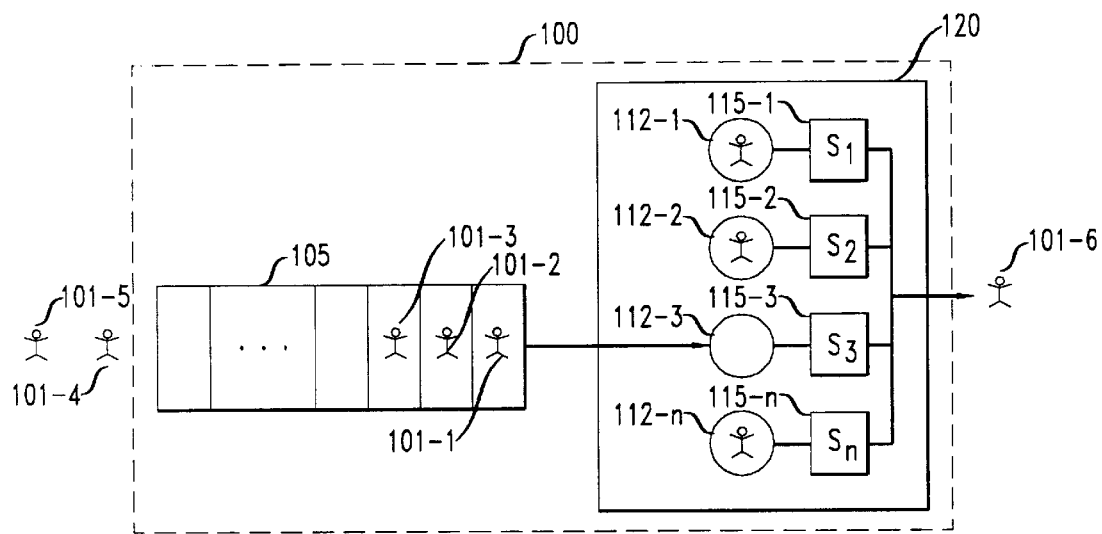
FIG. 1 illustrates a system in which the inventive method may be used.

FIG. 1 illustrates a queueing system in which the inventive method for allocating servers may be used. Queueing system 100 comprises queue 105 and service portion 120. Customers 101-i arrive and take a place in queue 105. In this exemplary system queue 105 is advantageously assumed to be infinitely long (so customers are never turned away or lost), and the service discipline is advantageously assumed to be first come-first served (FCFS). The arrival process of customers to the queue is advantageously characterized by one or more functions. For example, if the arrival process is Poisson, a single function, the arrival rate function $\lambda(t)$, can be used to characterize the arrival process exactly (then $\lambda(t)\Delta t$ describes the expected number of arrivals in the time interval (t, t+$\Delta t$) for small $\Delta t$). In other cases, the arrival process may be partially described by a time-dependent arrival rate function, $\lambda(t)$, and optionally by a time dependent variability function, $c_a^2(t)$, which describes the variability in the (random) arrival process about its deterministic rate $\lambda(t)$. With the functions $\lambda(t)$ and $c_a^2(t)$, two kinds of variability are captured. One kind of variability is represented by changes in the rate $\lambda(t)$ over time t. A second kind of variability (uncertainty or randomness) is captured by the function $c_a^2(t)$.

Referring again to FIG. 1, a customer exits the queue and enters service area 112-k in service portion 120 when server 115-k is available. For example in FIG. 1, customer 101-1 will exit queue 105 and enter service area 112-3 because server 115-3 is available after having finished providing service to customer 101-6 who has exited queue system 100.

The service times for each customer are advantageously treated as mutually independent and as independent of the arrival process. A cumulative distribution function, $G_t(x)$, is used to described the probability that the service time will be less than or equal to x given that a customer arrives at time t. As shown below, $G_t(x)$, if not known exactly, may advantageously be approximated based on its mean value.

The inventive method determines the required number of servers as a function of time, s(t), required to meet some criterion based on parameters characterizing the arrival and service processes, e.g. $\lambda(t)$, $c_a^2(t)$ and $G_t(x)$. In particular, s(t) is advantageously determined so that the probability of delay (i.e., the probability that a customer arriving at time t would have to wait before beginning to receive service) is approximately equal to a target probability at all times. The inventive method advantageously assumes that an infinite server queue is available, and the mean and variance of a random variable, $Q_\infty(t)$, describing the number of busy servers at time t in that infinite server queue is determined. (A random variable is a quantity that takes on a value in a range of values with a certain probability, i.e., that has a probability cumulative distribution function). In particular, the inventive method advantageously assumes initially that an infinite number of servers are available in the system which is essentially an averaging procedure that produces an effective arrival rate at all times (when scaled by the mean service time). A probability cumulative distribution function for $Q_\infty(t)$ is then used to determine the number of servers as a function of time. In particular, the number of servers is advantageously chosen to be the smallest possible value that the probability that all these chosen servers would be busy at time t is less than or equal to a target value.

Figure 2:
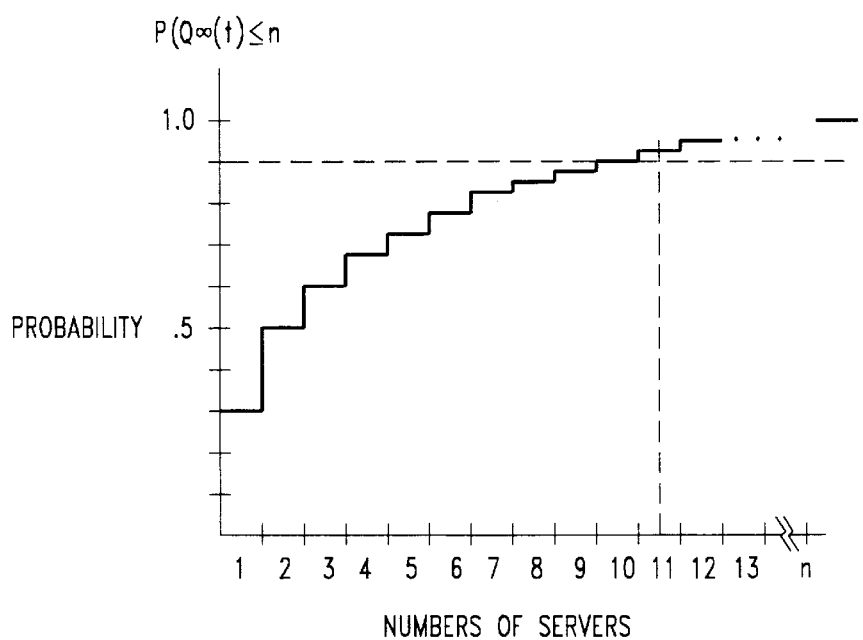
FIG. 2 illustrates determination of server levels based on a probability distribution.

FIG. 2 illustrates this process for an illustrative probability cumulative distribution function at a specific time $t_r$. Suppose the target probability is 0.1, i.e., there is a 10% chance that a customer will have to wait or alternatively, a 90% chance that customer will not have to wait. The idea to select a number of servers at time $t_r$, $s(t_r)$, so that the value of the probability cumulative density for that selected number of servers is just greater than 0.9, i.e. the probability of not having to wait. Thus, referring to FIG. 2, the number of servers at time $t_r$ should be selected to be eleven. If the number of servers is taken to be eleven, then the likelihood that more than eleven servers will be busy, i.e. that a customer will have to wait because the finite server system has only eleven servers, is slightly less than 0.1.

Figure 3:
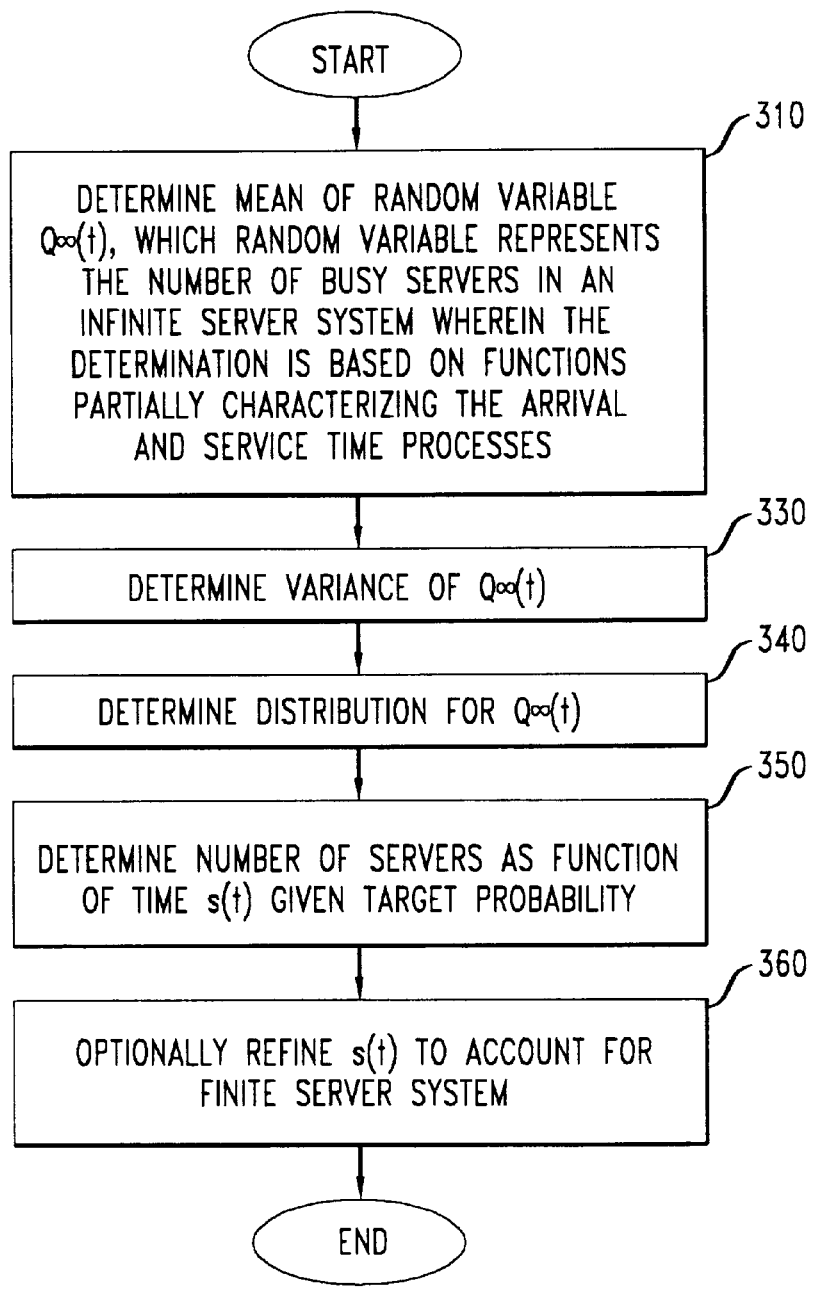
FIG. 3 illustrates steps in the inventive method.

FIG. 3 illustrates steps in the inventive method for allocating servers in a queueing system, and each step is described in detail below. In step 310, parameters characterizing the arrival process and service time process are used to determine the mean of the number of busy servers at time t assuming an infinite server queue. For the infinite server queue, assumed to start empty at some time prior to t, the mean number of busy servers as a function of time is (exactly)

$$m(t) = \int_{-\infty}^{t} G_u^c(t-u)\lambda(u)du, \tag{1}$$

where $G_u^c(t) \equiv 1 - G_u(t) \equiv P(S(u) > t)$ with S(u) being the service time of an arrival at time u and $\lambda(u)$ is the arrival rate at time u. Given only a mean $\gamma(t)$ for $G_t(x)$, $G_t(x)$ can be approximated by an exponential distribution with mean $\gamma(t)$; then $G_t(x)$ is treated as $(1-\exp(-x/\gamma(t))$.

Equation (1) is known to be valid for the case of nonstationary Poisson arrivals, but equation (1) remains valid without the Poisson assumption, provided that the arrival-rate function $\lambda(t)$ is well defined. See, S. G. Eick, W. A. Massey and W. Whitt, "The Physics of the $M_t/G/\infty$ Queue," Oper. Res., vol. 41, pp. 731–742 (1993); W. A. Massey and W. Whitt, "Networks of Infinite Server Queues with Nonstationary Poisson Input," Queueing Systems, vol. 13, pp. 183–250 (1993). Thus, m(t) may be determined using equation (1), either analytically or numerically, depending on the nature of the functions $\lambda$ and $G_t$. Simplifying assumptions and/or approximations that may be used to facilitate the determination of m(t) are discussed in Part II below.

In step 330 a determination is made of the variance of $Q_\infty(t)$. Note that if the arrival process is assumed to be Poisson, the number of busy servers at time t in the infinite server model has a Poisson distribution with the mean m(t) as in equation (1), and computations for step 330 are not necessary. Hence, as is the case with Poisson distributions, the variance v(t) equals the mean m(t). More generally, m(t) is regarded as the default value for v(t). If the arrival process is not Poisson, the variance v(t) of $Q_\infty(t)$ is advantageously determined based on W. Whitt, "Understanding the Efficiency of Multi-Server Service Systems," *Management Sci.*, vol. 38, pp. 708–723 (1992). In particular, the following approximation is used:

$$v(t) \approx z(t)m(t), \qquad (2)$$

where $$z(t) = 1 + \frac{(c_a^2(t) - 1)}{E[S(t)]} \int_0^\infty ([1 - G_t(x)])^2 dx, \qquad (3)$$

$$c_a^2(t) \approx \frac{Var[A(t) - A(t - \eta)]}{\int_{t-\eta}^t \lambda(u) du} \qquad (4)$$

for some suitable $\eta > 0$ and where $E[\cdot]$ is the expected value operator; in (4) Var is the variance, (i.e. Var $X = E[X^2] - (E[X])^2$) and $A(t)$ counts the number of arrivals before time t. The function $z(t)$ in (3) is a time-dependent generalization of the heavy-traffic peakedness. The peakedness is the ratio of the variance to the mean of the number of busy servers in a stationary infinite server queueing system. The heavy-traffic approximation is the limiting value as the arrival rate is made to increase to infinity. See, W. Whitt, "Heavy-Traffic Approximations for Service Systems with Blocking," *AT&T Bell Lab. Tech. J.*, vol. 63, pp. 689–708 (1984). The function $c_a^2(t)$ in (4) is a time-dependent generalization of the index of dispersion for counts (the variance divided by the mean of the number of arrivals in an interval). See, K. W. Fendick and W. Whitt, "Measurementx and Approximations to Describe the Offered Traffic and Predict the Average Workload in a Single-Server Queue," *Proc. IEEE*, vol. 77, pp. 171–194 (1989).

In step 340 once the mean and variance are found, an approximation for the distribution of the number of busy servers at time t, $Q_\infty(t)$, is determined. Given the approximate distribution, the number of servers as a function of time, $s(t)$, is selected in step 350 so that $$P(Q_\infty(t) \geq s(t)) \leq \alpha \qquad (5a)$$

and $$P(Q_\infty(t) \geq (s(t)-1)) > \alpha \qquad (5b)$$

for some prescribed target probability $\alpha$. Equation (5a) represents a determination of a value of $s(t)$ such that the probability of encountering a busy server at time t is less than $\alpha$ while equation (5b) represents a determination that one less server than the value of $s(t)$ would render the probability of encountering a busy server at time t greater than $\alpha$.

The inventive method recognizes that a normal approximation may advantageously be used with the result that computations for (5a) and 5(b) are simplified. Let $N(m, \sigma^2)$ denote a normal random variable with mean m and variance $\sigma^2$. Then the distribution of $Q_\infty(t)$ may be approximated by the distribution of $N(m(t), v(t))$ for a suitable mean function $m(t)$ and variance function $v(t)$ as described above. Hence, $[Q_\infty(t) - m(t)]/\sqrt{v(t)}$ is distributed approximately as $N(0,1)$, so that the number of servers is taken to be $$s(t) = \lceil m(t) + z_\alpha \sqrt{v(t)} \rceil \qquad (6)$$

where $\lceil x \rceil$ is the least integer greater than x and $z_\alpha$ satisfies $$P(N(0,1) > z_\alpha) = \alpha \qquad (7)$$

Equations (6) and (7) simply define the number of servers necessary so that the area under the normal distribution for the number of servers is greater than the selected number at time t is less than the target probability value. It is also advantageous to incorporate a refinement to account for the discreteness ($s(t)$ should be an integer) and thus $$s(t) = \lceil m(t) + 0.5 + z_\alpha \sqrt{v(t)} \rceil \qquad (8)$$

is advantageously used.

Finally, in step 360 refinements to the function $s(t)$ may optionally be made. The first refinement is based on known differences between finite-server and infinite server systems and the second refinement is based on a modified offered load approximation as described in detail below.

Thus, the inventive method recognizes that the number of servers as a function of time may be allocated, subject to a criterion, based on a probability distribution of the number of busy servers, wherein the probability distribution is characterized by a time-dependent mean function and a time dependent variance function, wherein the mean and variance functions are derived from a nonstationary infinite server queueing system.

II. Implementation of the Inventive Method

This section is divided into three parts. The first part describes simplifying approximations and/or assumptions that may be used in step 310 of FIG. 3 to determine the mean, $m(t)$, of $Q_\infty(t)$, the number of busy servers at time t in the infinite server system. The second part discusses further considerations in the determination of the variance, $v(t)$, of $Q_\infty(t)$. The final part describes in detail refinements that may be applied in determining $s(t)$.

A. Considerations in Determining $m(t)$

The inventive method (as illustrated in step 310 of FIG. 3) requires a determination of the mean, $m(t)$, of $Q_\infty(t)$, the number of busy servers given an infinite number of servers at time t. Advantageously, equation (1) may be used, but simplifying assumptions and/or approximations can facilitate the determination. For example, if the service-time distribution $G_t$ does not depend on t, then equation (1) can be rewritten as $$m(t) = E\left[\int_{t-S}^t \lambda(u) du\right] = E[\lambda(t - S_e)] E[S], \qquad (9)$$

where S is a generic service time and $S_e$ is a generic service-time stationary-excess random variable, i.e., $$P(S_e \leq t) = \frac{1}{E[S]} \int_0^t P(S > u) du \qquad (10)$$

see Eick et al., supra. Note from formulas (9) and (10) that the infinite server system mean $m(t)$ can be regarded as a smoothing of $\lambda(t)$ multiplied by the mean service time. Thus, the inventive method advantageously assumes initially that an infinite number of servers are available in the system which is essentially an averaging procedure that produces an effective arrival rate at all times (when scaled by the mean service time).

In the case where service times are time dependent, an approximation for time-dependent service times can be developed, assuming that $G_t(x)$ changes relatively slowly compared to $\lambda(t)$. There are many common situations in which this is the case. For example, measurements indicate that the holding-time distribution of telephone calls changes throughout the day, having a bigger mean in the evening than in the day, but this rate of change is slow compared to the rate of change of the arrival rate $\lambda(t)$. Assuming that the service-time distribution does indeed change relatively slowly, the following approximation to equation (9) based on equation (10) is introduced, namely, $$m(t) \approx E[\lambda(t-S_e(t))]E[S(t)], \quad (11)$$

where $S(t)$ has cumulative distribution function $G_t$ and $S_e(t)$ has cumulative distribution function $$P(S_e(t) \leq x) = \frac{1}{E[S(t)]} \int_0^x P(S(t) > u) du, \, x > 0. \quad (12)$$

Equation (1) above assumes that if the service-time distribution is associated with customers and is determined upon arrival. If instead each server is thought of as completing service at rate $\mu(t)$ at time t, then $S(t)$ can be approximated by an exponential random variable with mean $1/\mu(t)$. If, however, the service rate changes relatively quickly, then the exact (time-dependent exponential) cumulative distribution function could be used, i.e., $G_t(x)=1-G_t^c(x)$, where $$G_t^c(x) = e^{-\int_t^{t+x} \mu(u) du}, \, x \geq 0. \quad (13)$$

To apply the inventive method staffing procedure described in the overview above, the mean m(t) as a function of t for all times t of interest needs to be computed. The formulas (6)–(11) can be used directly, but they are not especially convenient for this purpose. However, if further assumptions are made, then very convenient procedures for computing m(t) can be obtained. In particular, efficient procedures can be obtained if simplifying assumptions about the service-time distribution are made.

First, if the service-time distribution is exponential with constant rate $\mu$, then m(t) can be obtained simply by solving the ordinary differential equation (ODE)

$$m'(t)=\lambda(t)-m(t)\mu, \quad (14)$$

where m(0) is given, e.g., m(0)=0 if the queue is empty at time 0; see Eick et al., supra. Note that equation (14) extends to time-dependent service rates. More generally, if there is a fixed phase-type service-time distribution with k phases, then the mean m(t) can be obtained by solving a system of k ODEs. See, J. L. Davis, W. A. Massey and W. Whitt, "Sensitivity to the Service-Time Distribution in the Nonstationary Erlang Loss Model," *Management Sci.*, vol. 42 pp. 1107–1116, (1995); W. A. Massey and W. Whitt, "An Analysis of the Modified Offered Load Approximation for the Nonstationary Erlang Loss Model," *Ann. Appl. Prob.*, vol. 4, pp. 1145–1160 (1994). For background on phase-type distributions, see M. F. Neuts, *Matrix-Geometric Solutions in Stochastic Models*, The Johns Hopkins University Press, Baltimore, 1981.

Second, instead of making special assumptions about the service-time distribution, it may be advantageous to assume a special structure for the arrival rate function $\lambda(t)$. Explicit formulas for m(t) when $\lambda(t)$ is sinusoidal are given in S. G. Eick, W. A. Massey and W. Whitt, "$M_t/G/\infty$ Queues with Sinusoidal Arrival Rates," *Management Sci.*, vol. 39, pp. 241–252 (1993). Explicit formulas for m(t) when $\lambda(t)$ is a polynomial or a step function are given in S. G. Eick, W. A. Massey and W. Whitt, "The Physics of the $M_t/G/\infty$ Queue," *Oper. Res.*, vol. 41, pp. 731–742 (1993).

However, in practice $\lambda(t)$ typically will not have a well-defined mathematical structure. A convenient technique for determining m(t) when $\lambda(t)$ is a general function estimated from data is as follows. General arrival rate functions arising in practice are treated by making polynomial (e.g., linear or quadratic) approximations to the arrival-rate function $\lambda(t)$ over subintervals. For example, m(t) can be computed over the interval [(k−1)c, kc) by using a polynomial approximation to $\lambda(t)$ over the interval [(k−j)c, kc), where c is an appropriate constant such as 5 mean service times and j is perhaps about 8. The polynomial approximation for $\lambda(t)$ can be fit to data using least squares or iterated weighted least squares. (Iterated weighted least squares yields the maximum likelihood estimator, but ordinary least squares usually performs almost as well.)

The ODEs provide a simple effective way to calculate m(t) for general $\lambda(t)$. Nevertheless, in some situations it may be desirable to have even more elementary approximations. For this purpose, quadratic approximations can be exploited to further simplify equation (11). In particular, a candidate approximation is $$m(t) \approx \lambda(t - E[S_e(t)])E[S(t)] + \frac{\lambda''(t)}{2} Var[S_e(t)]E[S(t)], \quad (15)$$

where $$E[S_e(t)]=E[S(t)^2]/2E[S(t)] \quad (16)$$

and $$Var(S_e((t))=(E[S(t)^3]/3E[S(t)])-(E[S(t)^2]/2E[S(t)])^2, \quad (17)$$

with $\lambda''(t)$ being computed based on a suitably smoothed estimate of $\lambda$. A convenient approximation for m(t), which tends to be appropriate when $\lambda(t)$ changes slowly, is equation (15) without the second term, i.e., equation (15) with $\lambda''(t) \approx 0$. See, S. G. Eick, W. A. Massey and W. Whitt, "The Physics of the $M_1/G/\infty$ Queue," *Oper. Res.*, vol. 41, pp. 731–742 (1993).

An even simpler approximation is the infinite server system pointwise stationary approximation (PSA), namely, $$m(t) \approx \lambda(t)E[S(t)]. \quad (18)$$

The quadratic approximation in equation (15) differs from PSA in (18) by a time lag $E[S_e(t)]$ and a space shift $\lambda''(t)Var[S_e(t)]E[S(t)]/2$. Equation (15) without the space shift is called shifted PSA. PSA in equation (18) is advantageously regarded as the natural initial approximation to m(t). The goal is to go beyond equation (18) and indicate when going beyond equation (18) is desirable. The refinement of equation (18) provided by equation (15) is only significantly better than (18) if the time lag and space shift are nonnegligible. Since the time lag and space shift can easily be computed explicitly, equation (15) is readily applied to determine when refinements to PSA should make a significant difference.

For example, consider an operator staffing problem in which staffing changes are made every fifteen minutes. If the service times are approximately exponentially distributed with a mean of about one minute, then PSA should be adequate because $E[S_e(t] \approx E[S(t)] \approx 1$. However, if the average service time is fifteen minutes or more, as might occur with telephone calls handled by travel agents or emergency services (police, fire, etc.), then the refinements are likely to be more important when there is significant variation in $\lambda(t)$ over time.

In summary, equation (8) with the exact mean m(t) in equation(1) (and the variance as discussed below) is the infinite server approximation for the original finite-server problem. If a fixed exponential service-time distribution is assumed, then m(t) can be obtained for any arrival-rate function by solving the ODE in equation (14). If a phase-type service-time distribution is used, then m(t) can be obtained by solving a corresponding system of ODEs. Equation (15) is proposed as a convenient approximation to equation (1), and PSA in equation (18) as a convenient approximation to equation (15). The time lag and space shift in equation (15) help evaluate the importance of doing more than PSA.

B. Considerations in Determining v(t)

Recall that in step 330 in FIG. 3, an expression for the variance of the random variable $Q_\infty(t)$ was given in equations (2)–(4). The derivation of equations (2–4) are explained below, which derivation uses results from the analysis of stationary infinite server systems. Recall that for a stationary infinite server system, the peakedness is the ratio of the variance to the mean of the steady-state number of busy servers. Hence, without time dependence, and with the true peakedness, equation (2) would be exact, not approximate, by definition. A detailed, but complicated, expression for the peakedness is available in considerable generality, e.g., A. E. Eckberg, "Generalized Peakedness of Teletraffic Processes," *Proc. Tenth Int. Teletraffic Congress*, Montreal, p. 4.4b.3, June, 1983. Equation (3) is given as a useful approximation.

There is additional support for the normal distribution with mean m(t) in equation (1) and variance v(t) in equation (2). For the special case of service-time distributions with a finite number of values, limiting results for stationary infinite server queueing systems extend to time-dependent arrivals to show that $Q_\infty(t)$ is asymptotically normally distributed with (exact) mean m(t) in (6) and (exact) variance v(t) in equation (2) as the entire arrival rate function increases. See, P. W. Glynn and W. Whitt, "A New View of the Heavy-Traffic Limit Theorem for Infinite Server Queues," *Adv. Appl. Prob.*, vol. 23, pp. 188–209 (1991).

The simple formula for z(t) in equation (3) is obtained by assuming $c_a^2(t)$ and $G_r(x)$ can be regarded as approximately stationary at time t. As for the approximation of the mean m(t) in equation (11), both $c_a^2(t)$ and $G_r(x)$ are assumed to change much more slowly than $\lambda(t)$. Indeed, it is often advantageous to consider $c_a^2(t)$ constant. It is easy to obtain specific processes with $c_a^2(t)$ constant by considering a deterministic time change of a stationary process with a well defined asymptotic variability parameter $c_a^2(t)$. See, W. A. Massey and W. Whitt, "Unstable Asymptotics for Nonstationary Queues," *Math. Oper. Res.*, vol. 19, pp. 267–291 (1994).

As in the stationary case, $z(t)=(c_a^2(t)+1)/2$ when the service-time cumulative distribution function $G_r(x)$ is exponential, and $z(t)=c_a^2(t)$ when the service-time cumulative distribution function is deterministic. In both cases, $z(t)=1$ when $c_a^2(t)=1$, as occurs with a Poisson process.

The idea in (4) is to obtain $c_a^2(t)$ as the variance to mean ratio of the counting process in the neighborhood of t. Look backward from t, since Q(t) depends on the arrivals before t. The estimate should be robust in the interval length η if $A(t)-A(t-\eta)$ is not too small and the variability is changing relatively slowly. If the arrival process is approximately a renewal process before time t, where interarrival times have squared coefficient of variation (SCV, variance divided by the square of the mean) $c_a^2$, then $c_a^2(t)$ should be just $c_a^2$.

The representation in equations (2)–(4) is convenient because modellers often have ideas about the relevant peakedness z(t) or the asymptotic variability parameter $c_a^2(t)$ from extensive experience with stationary models. In that case, to directly calculate or estimate $c_a^2(t)$ via equation (4) is straightforward. Thus, equations (2)–(4) permit the degree of stochastic variability to be specified directly in a relatively familiar way.

C. Considerations in Refining s(t)

Recall that in step 360 the inventive method optionally refines values for s(t). These refinements account for the fact that there are actually only finitely many servers. The goal is for equations (5a) and (5b) to hold for the random variable $Q_{s(t)}(t)$ rather than the variable $Q_\infty(t)$, where $Q_{s(t)}(t)$ is the actual number of customers in the system (in service or waiting in the queue) when the number of servers as a function of time is given by the function s(t).

The first refinement exploits a relationship between the tail probabilities $P(Q_\infty \geq s)$ and $P(Q_s \geq s)$ in stationary systems with ∞ and s servers, respectively, when the offered load $\lambda E[S]$ is large, where $\lambda$ is the arrival rate and $E[S]$ is the mean service time. See, S. Halfin and W. Whitt, "Heavy-Traffic Limits for Queues with Many Exponential Servers," *Oper. Res.* vol. 29, pp. 567–587 (1981); W. Whitt, "Understanding the Efficiency of Multi-Server Service Systems," *Management Sci.*, vol. 38, pp. 708–723, (1992). In this regime, when $P(Q_\infty \geq s))=\alpha$, then $$P(Q_s(t)) \geq s \equiv p_D(\alpha) \approx \left[1 + \sqrt{2\pi} z_\alpha (1-\alpha)\exp(z_\alpha^2/2)\right]^{-1} \quad (19)$$

Hence when a target probability α is used in the basic infinite server system described above, the actual delay probability tends to be approximately $p_D(\alpha)$, which is somewhat greater than α, especially when α is not small. For example, when α=0.1 and 0.01, $p_D(\alpha)$=0.132 and 0.115, respectively.

Since $p_D(\alpha)$ is a strictly increasing function of α, it is easy to construct the inverse function $p_D^{-1}(\beta)$; i.e. if $\alpha=p_D^{-1}(\beta)$, then $p_D(\alpha)=\beta$. The refinement thus uses the infinite server system as described above with target probability $p_D^{-1}(\alpha)$ instead of α.

The second refinement is an adjustment to s(t) after the function s(t) has been determined by the infinite server procedure, optionally with the first refinement above. The idea is to calculate $P(Q_{s(t)} \geq s(t))$ given that the function s(t) has been specified. The function s(t) is then adjusted, as necessary, so that, $$P(Q_{s(t)} \geq s(t)) \leq \alpha \quad (20a)$$

$$P(Q_{s(t)-1} \geq s(t)-1) > \alpha \quad (20b)$$

paralleling equations (5a) and (5b). For this purpose, it is advantageous to require that s(t) change only finitely often. Then the computation is done at a representative set of time points t.

The procedure is iterative. Moreover, it is advantageous to proceed from earlier times to later times in making these adjustments because adjustments of s(t) at any time t can change the delay probabilities at later times. The procedure is repeated after a new function s(t) is determined. The iterative procedure stops when the function s(t) ceases to change significantly.

If the arrival process is treated as Poisson and if the service times are treated as exponential or phase type, then the exact probabilities $P(Q_{s(t)} \geq s(t))$ required for the procedure above can be computed by solving a system of ODEs. (Exact computation is now possible because s(t) has been specified.)

It is also advantageous to use another approximation called the modified-offered-load (MOL) approximation for this purpose. The MOL approximation approximates $P(Q_s(t) \geq k)$ for any k by the steady-state probability $P(Q_s \geq k)$ assuming that the number of servers is fixed at s, but uses m(t)/s(t) as the traffic intensity ρ, where m(t) is the mean number of busy servers in the infinite server system previously determined. The MOL approximation is easy to apply because the steady-state tail probability has a known explicit formula in terms of ρ. The MOL approximation is motivated by the fact that it is exact when the model is actually stationary.

The MOL approximation for loss models is discussed in W. A. Massey and W. Whitt, "An Analysis of the Modified Offered Load Approximation for the Nonstationary Erlang Loss Model," *Ann. Appl. Prob.* vol. 4, pp. 1145–1160 (1994). The MOL approximation for delay models has essentially the same form (same idea works there).

III. Conclusion

The above method of determining the number of servers in a queueing system is not limited to the specific examples illustrated above. For example, the target probability α may be a function of time, in which case the extension is straightforward in equation (8) where α is replaced by α(t). Further, although the inventive method allows server staffing levels to be changed at arbitrary times, it is also possible to permit changes to made only at user specified times, $t_i$, i=1, 2, ... Then, throughout the interval $[t_i, t_{i+1})$, s(t) is set equal to the maximum value of s(t) as computed above over that interval. The method also permits other constraints, such as servers being brought in or removed only in groups of certain sizes as by selecting s(t) to be the next permissible group size. In such cases, s(t) is the least integer such that all constraints are satisfied. Note that the inventive method is applicable when there is no waiting room or buffer space in the queue or, more generally, a finite waiting room, as well as when there is an infinite queue. Finally, the inventive method also applies in situations in which a serving system comprises either multiple queues (as in a supermarket) as well as when there is a single queue (as in many banks).

What is claimed is:

1. A method for temporal allocation of a number of servers in a nonstationary finite server queueing system comprising the steps of:

determining a probability distribution function of a number of busy servers in a nonstationary finite server queueing system as a function of time, based on input parameters representing servers and customers and interaction therebetween in said system, wherein one of said input parameters characterizes an arrival rate of customers to said finite server queueing system, wherein one of said input parameters characterizes a service time distribution for a customer arriving at said finite server queueing system, wherein said probability distribution is characterized by a mean function and a variance function, wherein said mean function and said variance function are based on said input parameters;

determining a number of servers for allocation to said finite server queueing system based on said distribution and based on a target probability; and allocating the number of servers needed at a given time in said system as determined in said determining steps.

2. The method of claim 1 wherein said target probability is a delay probability characterizing the probability that a customer in said finite server queueing system will have to wait before receiving service.

3. The method of claim 1 wherein said mean function is function of time, m(t), determined according to $$m(t) = \int_{-\infty}^{t} G_u^c(t-u)\lambda(u)du,$$

where $G_u^c(t) \equiv 1 - G_u(t) \equiv P(S(u) > t)$ with S(u) being the service time of a customer arriving at time u to said finite server queueing system and λ(u) is the arrival rate of said finite server queueing system at time u.

4. The method of claim 3 wherein said variance function is a function of time, v(t), determined according to v(t)≈z(t)m(t), where $$z(t) = 1 + \frac{(c_a^2(t) - 1)}{E[S(t)]} \int_0^{\infty} [1 - G_t(x)]^2 dx,$$

$$c_a^2(t) \approx \frac{Var[A(t) - A(t-\eta)]}{\int_{t-\eta}^{t} \lambda(u)du}$$

where η>0, where A(t) counts the number of arrivals before time t and where Var is the variance.

5. The method of claim 1 or claim 2 or claim 3 wherein said service time distribution is an exponential function characterized by a time-varying mean.

6. The method of claim 1 or claim 3 wherein said arrival rate specifies a Poisson arrival process and wherein said variance function is equal to said mean function.

7. The method of claim 1 wherein said probability distribution function of said number of busy servers in said nonstationary infinite server queueing system characterized as a normal distribution..

8. The method of claim 1 wherein said number of servers for said finite server queueing system is adapted using a modified offered load approximation.

9. The method of claim 1 wherein said target probability, α, is adapted so that the target probability is replaced by a quantity, $p_D^{-1}(\alpha)$, where $p_D^{-1}(\alpha)$ is the inverse of $p_D(\alpha)$ where $$p_D(\alpha) \approx \left[1 + \sqrt{2\pi}\, z_\alpha(1-\alpha)\exp(z_\alpha^2/2)\right]^{-1}$$

and where $z_\alpha$, for a normal distribution characterized by a mean of zero and a standard deviation of one, N(0,1), satisfies $P(N(0,1) > z_\alpha) = \alpha$, where P(•) is the probability.

* * * * *